United States Patent
Prodan et al.

(10) Patent No.: US 9,203,869 B2
(45) Date of Patent: Dec. 1, 2015

(54) METHOD AND SYSTEM FOR OPTIMIZING COMMUNICATION IN A HOME NETWORK VIA A GATEWAY

(75) Inventors: Rich Prodan, Niwot, CO (US); Jeyhan Karaoguz, Irvine, CA (US); Xuemin Chen, Rancho Santa Fe, CA (US); Wael William Diab, San Francisco, CA (US); David Garrett, Tustin, CA (US); David Lundgren, Mill Valley, CA (US)

(73) Assignee: BROADCOM CORPORATION, Irvine, CA (US)

( * ) Notice: Subject to any disclaimer, the term of this patent is extended or adjusted under 35 U.S.C. 154(b) by 936 days.

(21) Appl. No.: 12/982,196

(22) Filed: Dec. 30, 2010

(65) Prior Publication Data

US 2011/0299546 A1    Dec. 8, 2011

Related U.S. Application Data

(60) Provisional application No. 61/351,696, filed on Jun. 4, 2010.

(51) Int. Cl.

| | |
|---|---|
| *H04L 12/54* | (2013.01) |
| *H04L 29/06* | (2006.01) |
| *H04W 12/08* | (2009.01) |
| *G06Q 20/10* | (2012.01) |
| *H04L 12/857* | (2013.01) |
| *H04L 29/08* | (2006.01) |
| *G06Q 30/02* | (2012.01) |
| *G06F 21/10* | (2013.01) |
| *H04L 12/24* | (2006.01) |

(52) U.S. Cl.
CPC .............. *H04L 65/102* (2013.01); *G06F 21/10* (2013.01); *G06Q 20/10* (2013.01); *G06Q 30/0226* (2013.01); *H04L 47/2491* (2013.01); *H04L 63/0281* (2013.01); *H04L 63/10* (2013.01); *H04L 63/205* (2013.01); *H04L 65/40* (2013.01); *H04L 67/10* (2013.01); *H04W 12/08* (2013.01); *H04L 41/32* (2013.01); *H04L 41/5019* (2013.01)

(58) Field of Classification Search
CPC .............. H04L 29/08072; H04L 29/06; H04L 29/0809; H04L 47/10; H04L 49/90
See application file for complete search history.

(56) References Cited

U.S. PATENT DOCUMENTS

| | | | | |
|---|---|---|---|---|
| 7,194,506 | B1 * | 3/2007 | White et al. ................... | 709/203 |
| 8,259,737 | B2 * | 9/2012 | Moussa et al. ................ | 370/401 |
| 8,510,773 | B1 * | 8/2013 | Abou-Rizk et al. ............ | 725/34 |
| 2003/0028490 | A1 * | 2/2003 | Miura et al. .................... | 705/59 |
| 2003/0156543 | A1 * | 8/2003 | Sahinoglu et al. ............. | 370/238 |

(Continued)

*Primary Examiner* — Mounir Moutaouakil
(74) *Attorney, Agent, or Firm* — Foley & Lardner LLP

(57) ABSTRACT

A method and system are provided in which a content request may be received by a broadband gateway from a device connected to the broadband gateway through a home network. The broadband gateway may select content that corresponds to the request from content that is available through a network access service provider and/or from other devices in the home network. The selection of the content corresponding to the request may be based on capability information of the device. The capability information may comprise display, audio reproduction, encoding, decoding, and/or storage capabilities, for example. The selection may be based on an optimization associated with a bandwidth to transfer the content within the home network and/or a power consumed to process the content. The content that is selected may be received and processed by the broadband gateway, and/or by another device in the home network, before being communicated to the device.

20 Claims, 12 Drawing Sheets

(56) References Cited

U.S. PATENT DOCUMENTS

| | | | |
|---|---|---|---|
| 2004/0193648 A1* | 9/2004 | Lai et al. | 707/104.1 |
| 2006/0084461 A1* | 4/2006 | Sekiya et al. | 455/522 |
| 2007/0061398 A1* | 3/2007 | Forssell | 709/204 |
| 2007/0135082 A1* | 6/2007 | Erhart et al. | 455/343.5 |
| 2008/0200154 A1* | 8/2008 | Maharajh et al. | 455/414.3 |
| 2008/0242325 A1* | 10/2008 | Bandera et al. | 455/466 |
| 2009/0080445 A1* | 3/2009 | Kolakeri et al. | 370/401 |
| 2009/0175272 A1* | 7/2009 | Hedaoo et al. | 370/390 |
| 2010/0057748 A1* | 3/2010 | Ensor et al. | 707/10 |
| 2010/0088570 A1* | 4/2010 | Choi et al. | 714/751 |
| 2010/0115259 A1* | 5/2010 | Elsila et al. | 713/100 |
| 2010/0115575 A1* | 5/2010 | Yu et al. | 725/142 |
| 2011/0072106 A1* | 3/2011 | Hoffert et al. | 709/217 |
| 2011/0087842 A1* | 4/2011 | Lu et al. | 711/126 |
| 2011/0116482 A1* | 5/2011 | Ansari | 370/338 |
| 2011/0252082 A1* | 10/2011 | Cobb et al. | 709/203 |
| 2011/0302276 A1* | 12/2011 | Karaoguz et al. | 709/219 |
| 2012/0225696 A1* | 9/2012 | Kitani et al. | 455/566 |
| 2013/0145263 A1* | 6/2013 | Blumenau | 715/273 |

\* cited by examiner

METHOD AND SYSTEM FOR OPTIMIZING COMMUNICATION IN A HOME NETWORK VIA A GATEWAY

CROSS-REFERENCE TO RELATED APPLICATIONS/INCORPORATION BY REFERENCE

This application claims the benefit of U.S. Provisional Patent Application 61/351,696, filed on Jun. 4, 2010.

This application also makes reference to:
U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010;
U.S. patent application Ser. No. 12/982,355 filed on Dec. 30, 2010,
U.S. patent application Ser. No. 12/981,971 filed on Dec. 30, 2010;
U.S. patent application Ser. No. 12/981,993 filed on Dec. 30, 2010;
U.S. patent application Ser. No. 12/982,216 filed on Dec. 30, 2010;
U.S. patent application Ser. No. 12/984,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/381,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/982,414 filed on Dec. 30, 2010; and
U.S. patent application Ser. No. 12/981,733 filed on Dec. 30, 2010.

Each of the above stated applications is hereby incorporated herein by reference in its entirety.

FIELD OF THE INVENTION

Certain embodiments of the invention relate to broadband access. More specifically, certain embodiments of the invention relate to optimizing communication in a home network via a gateway.

BACKGROUND OF THE INVENTION

As the use of home networks grow in popularity, the capabilities of today's gateway devices may not be adequate to support certain applications and content to be provided through such networks.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for optimizing communication in a home network via a gateway, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for optimizing communication in a home network via a gateway. In accordance with various embodiments of the invention, a content request may be received by a broadband gateway from a device connected to the broadband gateway through a home network. The broadband gateway may select a content, which corresponds to the request made by the device, from content that is available through at least one network access service provider associated with the broadband gateway. The selection of the content corresponding to the request may be based on capability information of the device. The stored capability information may comprise display capabilities, audio reproduction capabilities, encoding capabilities, decoding capabilities, and/or storage capabilities, for example. The selection may also be based on an optimization associated with one or both of a bandwidth to transfer the content within the home network and a power consumed to process the content. The selected content may be received and processed by the broadband gateway, and/or by another device in the home network, before being communicated to the device.

Accordingly, a broadband gateway may be utilized to reduce the bandwidth needs and/or the power consumed in a home network by intelligently determining which type of content to provide to a particular device in the home network. In this regard, the broadband gateway may determine that content having certain characteristics may not only be suitable for handling by the particular device that requested the content based on the device's capabilities, but that the selection of such content may also allow the home network to operate more efficiently.

Figure 1:
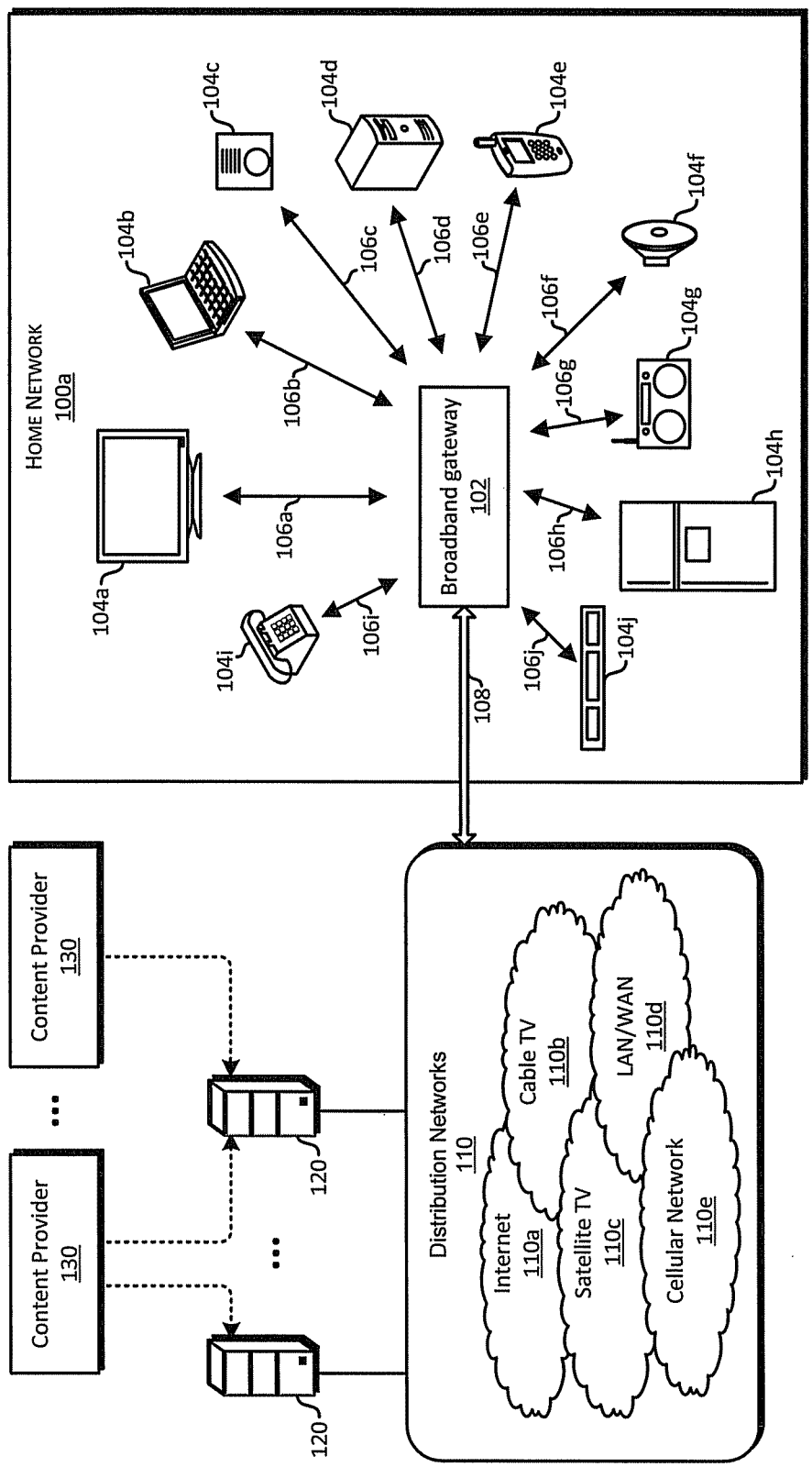
FIG. 1 is a block diagram illustrating an exemplary communication system that comprises a home network serviced by a broadband gateway, in accordance with an embodiment of the invention.

FIG. 1 is a block diagram illustrating an exemplary communication system that comprises a home network serviced by a broadband gateway, in accordance with an embodiment of the invention. Referring to FIG. 1, there is shown a home network 100a, a plurality of distribution networks 110, a plurality of network access service providers 120, and a plurality of content providers 130. The home network 100a may be serviced by a broadband gateway 102.

The content providers 130 may generate, capture, and/or package content, such as multimedia content, for example, that may be distributed to end users. Content originating from the content providers 130 may be distributed to end users (e.g., consumers) by the network access service providers 120. The term "network access service provider" as utilized herein, may be distinguished from the more generic term "service provider" that may refer to services other than providing physical layer access to a network. An entity that functions as a network access service provider, however, may also provide content and/or services other than network access. In some instances, an entity that functions as a network access service provider may generate, capture, and/or package content, such as multimedia content, for example, that may be distributed to end users. The content received through the network access service providers 120 may comprise programming scheduling information and/or metadata associated with such programming. In some instances, the metadata may originate in a server, such as a web server, associated with one or more of the content providers 130.

Moreover, information associated with the content, whether in the form of metadata or otherwise, may be received by the broadband gateway 102. For example, the information regarding the characteristics of video streams that may be available to the broadband gateway 102 through the network access service providers 120, and/or available from a device in the home network 100a, may be provided to the broadband gateway 102. Such information may comprise, but need not be limited to, the number of frames per second, the type of interlacing, the display resolution, the aspect ratio, the color space and the bits per pixel, the video quality, the video compression method, the bit rate, the video display standards, and/or whether the video is stereoscopic. Information regarding the characteristics of audio streams may also be provided to the broadband gateway 102. Such information may comprise, but need not be limited to, identification of the sound format such as whether the sound is monophonic, stereophonic, and/or surround sound, for example. For surround sound formats, for example, the information may indicate whether the surround sound format is a cinema 5.1 formats such as Dolby Digital and DTS, a cinema 8 format such as Sony Dynamic Digital Sound (SDDS), or a cinema 7.1 formats, for example. These sound formats are provided by way of illustration and not of limitation. Accordingly, information regarding other types of sound formats may also be received by the broadband gateway 102.

The network access service providers 120 may comprise various entities and/or networks that provide access to content and/or services using different access technologies, such as multimedia, television, Internet, phone, Ethernet, multimedia over coax alliance (MoCA), passive optical network (PON), and/or cellular services, for example, to a plurality of end users. The end users may utilize devices that may be configured to support the necessary networking and/or communication infrastructures and/or standards. For example, end users may utilize cellular devices or smartphones, personal computers (PCs), servers, and/or set-top boxes. Exemplary network access service providers may comprise, for example, cellular service providers (e.g., AT&T, Verizon), cable television (CATV) providers (e.g., Comcast, RCN, Cox), satellite television providers (e.g., DirectTV, DISH Network), Internet service providers (ISPs), digital subscriber line (DSL) providers, WiMAX providers, and/or plain old telephone service (POTS) providers. In an exemplary embodiment of the invention, the broadband gateway 102 may enable connecting to a plurality of network access service providers 120 to facilitate receiving content originating from one or more of the content providers 130. When more than one network access service provider 120 provides access to content and/or services to the broadband gateway 102, each network access service provider 120 may do so through a separate physical layer access. In an embodiment of the invention, a separate physical layer access may be enabled in the broadband gateway 102 by having a separate network interface for each network access service provider 120 within the broadband gateway 102.

The plurality of distribution networks 110 may comprise one or more networks that may be operable to enable wireless and/or wired communication among a plurality of entities based on one or more networking and/or communication infrastructures. In this regard, the plurality of distribution networks 110 may be utilized to enable distributing content generated by the content providers 130 and/or by the network access service providers 120 to end users. The network connectivity available via the plurality of distribution networks 110 may be based on one or more communication standards and/or protocols. The plurality of distribution networks 110 may comprise, for example, the Internet 110a, a CATV network 110b, a satellite television (TV) network 110c, a wireless local area network/wide area network (LAN/WAN) 110d, and/or a cellular network 110e.

The Internet 110a may comprise a system of interconnected networks to enable exchange of data between a plurality of nodes, based on one or more networking standards, including, for example, the Internet Protocol (IP). For example, the Internet 110a may enable connectivity among a plurality of private and public, academic, business, and/or government nodes and/or networks. The physical connectivity may be provided in the Internet 110a via, for example, the Public Switched Telephone Network (PSTN), copper wires, fiber-optic cables, wireless interfaces, and/or other protocols and/or standards-based interfaces. The transport functionality may be performed in the Internet 110a based on, for example, one or more protocols, such as the Transmission Control Protocol/IP (TCP/IP), for example. The CATV network 110b may comprise suitable distribution nodes, systems, and/or subnetworks that may enable forwarding of communication between CATV providers and a plurality of cable-TV consumers. For example, the CATV network 110b may comprise a network of fiber optics and/or coaxial cables for use in CATV broadcasts. The satellite TV network 110c may comprise suitable distribution nodes, systems, and/or subnetworks that may enable communication of satellite TV broadcast by satellite TV providers to a plurality of consumers. For example, the satellite network 110c may comprise a plurality of orbiting satellite nodes and/or one or more terrestrial centers in a satellite-TV system.

The LAN/WAN network 110d may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks. The cellular network 110e may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110e may comprise, for example, a plurality of control and/or switching nodes, and a plurality of base stations that enable transmission and/or reception of cellular based communications between the cellular network 110e and cellular capable devices.

The home network 100a may correspond to a location that may comprise a plurality of devices which may be serviced and/or managed by the broadband gateway 102. In this regard, the location may be a residence (e.g., home, apartment), a small business, a school, a library, and/or other like settings in which users may want to obtain access to service and/or to content provider networks. The broadband gateway 102 may be utilized in the home network 100a to provide connectivity between the home network 100a and the network access service providers 120, the distribution networks 110, and/or the content providers 130.

The broadband gateway 102 may comprise suitable logic, circuitry, interfaces, and/or code that may be operable to provide connectivity between one or more devices in a home network, such as the home network 100a, and a plurality of external networks. For example, the broadband gateway 102 may support configuring and/or using a plurality of broadband connections 108 to the distribution networks 110. The broadband connections 108 may comprise wired and/or wireless connections between the broadband gateway 102 and the distribution networks 110, which may enable communication between the broadband gateway 102 and the network access service providers 120. The broadband gateway 102 may operate as an interface device that may allow one or more network access service providers and/or content providers to interact with various devices in the home network. In this regard, the broadband gateway 102 may enable communication with each of the network access service providers 120 through separate interfaces. That is, each network access service provider 120 from the plurality of network access service providers 120 may interface with the broadband gateway 102 through a network interface that is separate and/or different from a network interface associated with each of the other network access service providers 120.

A single broadband gateway 102 may be operable to handle multiple physical layer access connections, where a physical layer may refer to an Open Systems Interconnection (OSI) layer 1. The connections may provide access to one or more of the distribution networks 110. The distribution networks 110 may be owned, operated, leased, or otherwise associated with different network access service providers 120. For example, one network access service provider 120 may provide network access to the broadband gateway 102 through a cable television connection over coaxial cabling associated with the CATV network 110b. In another example, a different network access service provider 120 may provide network access to the broadband gateway 102 through a DSL connection over twisted-pair cabling associated with the Internet 110a. In some instances, the broadband gateway 102 may be operable to concurrently communicate over several physical layer connections associated with the multiple network access service providers 120.

The broadband gateway 102 may be operable to perform and/or provide various services that may pertain to enabling and/or facilitating reception of multimedia content. The content may be delivered through one or more network access services providers 120 and their associated networks, which may include at least some portions of the distribution networks 110. For example, the broadband gateway 102 may be operable to perform such operations as network access related processing (e.g., PHY/MAC, transport layer processing), encryption and/or decryption, user and/or account authentication, and/or at least some of video and/or audio processing operations that may be needed for consumption of multimedia content. The broadband gateway 102 may communicate with various devices in the home network 100a, using wired and/or wireless communication links.

Devices serviced by, and/or connected to the broadband gateway 102 may comprise content consuming devices and/or other, non-content consuming household or home devices that may be operable to interact with the broadband gateway 102. For example, the broadband gateway 102 may service, and/or may communicate with a plurality of home devices 104a-104j in the home network 100a. The home devices may comprise, for example, one or more of a television 104a, a laptop computer 104b, a detector 104c (e.g., a smoke detector, a carbon monoxide detector, a security alarm), a computer and/or server 104d, a mobile phone 104e, a speaker 104f, an AM/FM radio 104g, a phone 104h, an appliance 104i (e.g., refrigerator), and a digital video recorder (DVR) or personal video recorder (PVR) 104j. The broadband gateway 102 may interact with each of the home devices 104a-104j via links 106a-106j, which may be supported by the broadband gateway 102 and the corresponding home device. For example, the link 106a between the broadband gateway 102 and the television 104a may comprise a High-Definition Multimedia Interface (HDMI) cable and/or 60 GHz WiGig wireless connection/interface. The link 106b may comprise, for example, a wired Ethernet link, a wireless Ethernet link, a Universal Serial Bus (USB) link, or an IEEE 1394 link. The link 106c may comprise, for example, a two-wire link or a wireless link. The link 106d may comprise, for example, a wired Ethernet link, a wireless Ethernet link, a USB link, or an IEEE 1394 link. The link 106e may comprise, for example, a wireless Ethernet link, a USB link, or a cellular link. The link 106f may comprise speaker wire and/or a wireless link. The link 106g may comprise, for example, AM and/or FM radio transmissions broadcast received using the broadband gateway 102. The link 106h may comprise, for example, a phone line. The link 106i may comprise, for example, a wired or wireless Ethernet link. The link 106j may comprise, for example, a wired or a wireless link.

In the exemplary embodiment of the invention illustrated in FIG. 1, although the devices 104a-104j, which may be communicatively coupled to only the broadband gateway 102, are shown, the invention may not be so limited. Accordingly, the devices 104a-104j, which may be communicatively coupled to multiple broadband gateways in a local or home network, may be implemented without departing from the spirit and scope of various embodiments of the invention.

In operation, the broadband gateway 102 may be utilized as an interface device that may allow one or more of the network access service providers 120 and/or the content providers 130 to interact with various devices in a home network, such as the home network 100a. The broadband gateway 102 may be operable to perform and/or provide various services that may pertain to enabling and/or facilitating reception of content, such as multimedia content, for example. The broadband gateway 102 may distribute the received content to one or more devices in the home network 100a for consumption.

The broadband gateway 102 may also be operable to receive requests for content from one or more of the home devices 104a-104j in the home network 100a. The broadband gateway 102 may select a content corresponding to the request from content that is available through at least one of the network access service providers 120. In this regard, the available content may be provided by one or more sources of content. In some instances, the selection may also be based on content available from the home devices 104a-104j. The selection of the content corresponding to the request may be based on capability information of the home device requesting the content. Such capability information may be stored in the broadband gateway 102 and/or may be provided in connection with the request. The capability information may comprise display capabilities, audio reproduction capabilities, encoding capabilities, decoding capabilities, and/or storage capabilities, for example. The selection may also be based on an optimization associated with a bandwidth to transfer the content within the home network 100a and/or with a power consumed to process the content by the broadband gateway 102 and/or by a home device in the home network 100a other than the home device making the request. The content that is selected may be received and processed before being communicated to the home device that made the request. The processing may be performed by the broadband gateway 102 and/or by another home device in the home network 100a.

Figure 2A:
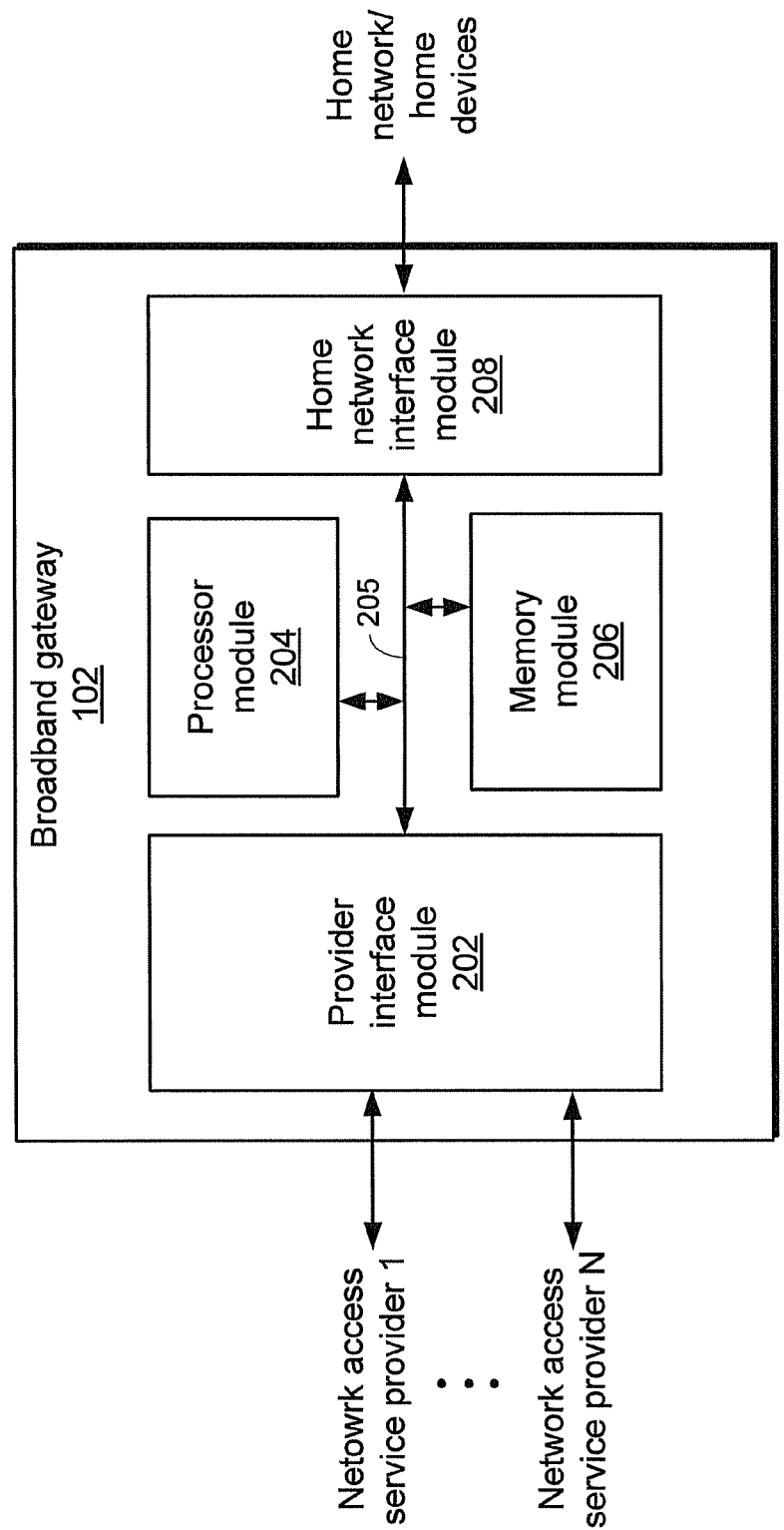
FIGS. 2A and 2B are block diagrams that illustrate exemplary broadband gateways, in accordance with embodiments of the invention.

FIG. 2A is a block diagram illustrating an exemplary broadband gateway, in accordance with an embodiment of the invention. Referring to FIG. 2A, there is shown a more detailed view of an exemplary architecture of the broadband gateway 102 described above with respect to FIG. 1. The broadband gateway 102 may comprise suitable logic, circuitry, code, and/or interfaces that may be operable to provide connectivity between one or more networks, such as the distribution networks 110, for example, and one or more devices in a home network, such as the home devices 104a-104j in the home network 100a. Access from the broadband gateway 102 to the distribution networks 110 may be provided through one or more of the network access service providers 120.

The broadband gateway 102 may operate as an interface device that allows one or more network access service providers 120 and/or content providers 130 to interact with various devices in the home network 100a, such as the home devices 104a-104j. Moreover, when more than one network access service provider 120 is utilized to provide access, the broadband gateway 102 may handle each of network access service providers 120 through a separate physical layer access.

The broadband gateway 102 may comprise suitable hardware and/or software to provide some or all of the functions and/or operations of one or more of a modem, a router, and a switch. The modem functions and/or operations may be those of a DSL modem, a cable modem, or a wireless cable modem, for example. The router functions and/or operations may be those of a wireless router, for example. The switch functions and/or operations may be those of a network switch, or a local area network (LAN) switch, for example. In some instances, the broadband gateway 102 may communicate with the various devices in the home via more than one home network.

The broadband gateway 102 may comprise one or more modules. Each of these modules may comprise hardware, software, or a combination thereof that may be utilized to perform various operations associated with the broadband gateway 102. In an embodiment of the invention, the broadband gateway 102 may comprise a provider interface module 202, a processor module 204, a memory module 206, and a client network interface module 208. The modules in the broadband gateway 102 may communicate with one or more of the other modules through one or more buses and/or connections 205. In some instances, the broadband gateway 102 may be such that the various modules listed above may be distributed over multiple devices. In such instances, the buses and/or connections 205 may enable communication between the various modules across the multiple devices. Moreover, the modules listed above are provided by way of illustration and not of limitation. Other configurations and/or architectures of the broadband gateway 102 may also be implemented. For example, the broadband gateway 102 may be a virtual gateway that is setup in a network by utilizing virtual machines (VMs) and/or next-generation (NG) data centers.

The provider interface module 202 may comprise suitable logic, circuitry, code, and/or interfaces that may be operable to receive data and/or to send data through one or more of the network access service providers 120, for example. The data received and/or sent may be associated with content from the content providers 130 and/or from the network access service providers 120. The provider interface module 202 may be operable to support multiple communication protocols, standards, and/or data transport technologies. As illustrated in FIG. 2, the provider interface module 202 may be operable to interface with one or more of the network access service providers 120. In an embodiment of the invention, the provider interface module 202 may be operable to interface with N of the network access service providers 120. The provider interface module 202 may be communicatively coupled to the various network access service providers 120 via a plurality of broadband connections 108 described above with respect to FIG. 1.

The processor module 204 may comprise suitable logic, circuitry, code, and/or interfaces that may be operable to process data received and/or sent through one or more of the network access service providers 120, and/or data received from and/or sent to one or more devices in the home network 100a. In this regard, the processor module 204 may comprise one or more portions that are suitable to handle certain types of data such as video data and/or audio data, for example. For example, the processor module 204 may comprise a core processor (not shown), a video processor (not shown), and an audio processor (not shown).

The processor module 204 may be operable to process requests for content from one or more home devices in the home network 100a. In this regard, the processor module 204 may be operable to analyze a request from a home device to determine the content that is being requested. The processor module 204 may be operable to determine the capabilities of the home device to handle certain types of content based on capability information associated with the home device that may be stored in, for example, the memory module 206. The processor module 204 may be operable to generate, based on the capabilities of the home device, requests for information associated with content that may be available to the broadband gateway 102 and that may correspond to the content being requested by the home device. Such information may comprise information about the characteristics of such content, for example. The information may be requested from one or more providers of content and/or services that provide such content and/or services through the network access service providers 120. In some instances, the information may be requested from other home devices connected to the broadband gateway 102 through the home network 100a.

Once the information about the content is received, the processor module 204 may process the information to determine and/or select, from the content available to the broadband gateway 102, the content that corresponds to the request made by the home device. In this regard, the processor module 204 may be operable to determine an optimization parameter associated with each content being considered when selecting the appropriate content for the home device. The processor module 204 may select as the appropriate content for the home device the content that has a preferred optimization parameter value. In some instances, the processor module 204 may be operable to handle multiple requests from one or more home devices concurrently.

The memory module 206 may comprise suitable logic, circuitry, code, and/or interfaces that may be operable to store data utilized in the operations of the broadband gateway 102. For example, the memory module 206 may be utilized to store configuration data, parameters, device information, tracking and/or monitoring information, security information, and intermediate processing data, for example. The memory module 206 may comprise storage media that may be integrated in the broadband gateway 102 and/or may be removable such as a removable storage device.

The memory module 206 may be operable to store information associated with the capabilities of the various home devices in the home network 100a. For example, the memory module 206 may be operable to store information regarding the display capabilities, audio reproduction capabilities, encoding capabilities, decoding capabilities, and/or storage capabilities, for one or more of the home devices 104a-104j in the home network 100a, for example. The memory module 206 may be operable to store information associated with the characteristics of the content that may be available to the broadband gateway 102. For example, the memory module 206 may be operable to store information regarding the characteristics of video streams and/or audio streams of various types of content that may be available to the broadband gateway 102. The memory module 206 may also be operable to store information that may be utilized to determine an optimization parameter associated with a particular type of content. For example, the memory module 206 may be operable to store information regarding bandwidth requirements in the home network 100a and/or information regarding the amount of power that may be needed to perform certain operations on content, such as encoding, decoding, transcoding, transrating, and/or transsizing the content, for example.

The client network interface module 208 may comprise suitable logic, circuitry, code, and/or interfaces that may be operable to receive data from and/or send data to one or more devices in the home network. The client network interface module 208 may be operable to support multiple communication protocols, standards, and/or data transport technologies.

In operation, the broadband gateway 102 may receive a request for content from one or more of the home devices 104a-104j in the home network 100a through the home network interface module 208. The processor module 204 may be utilized to select a content, which corresponds to the request from a home device, from content that is available through one or more of the network access service providers 120 associated with the broadband gateway 102. The selection of the content corresponding to the request may be performed by the processor module 204 based on the capabilities of the home device requesting the content. Information regarding the capabilities of the home device may be stored in the memory module 206. The selection performed by the processor module 204 may also be based on an optimization parameter determined by the processor module 204 for the content that is being considered to make the selection. The content that is selected by the processor module 204 may be received through the provider interface module 202, processed by the processor module 204 when appropriate, and communicated to the corresponding home device through the home network interface module 208 for user consumption.

Figure 2B:
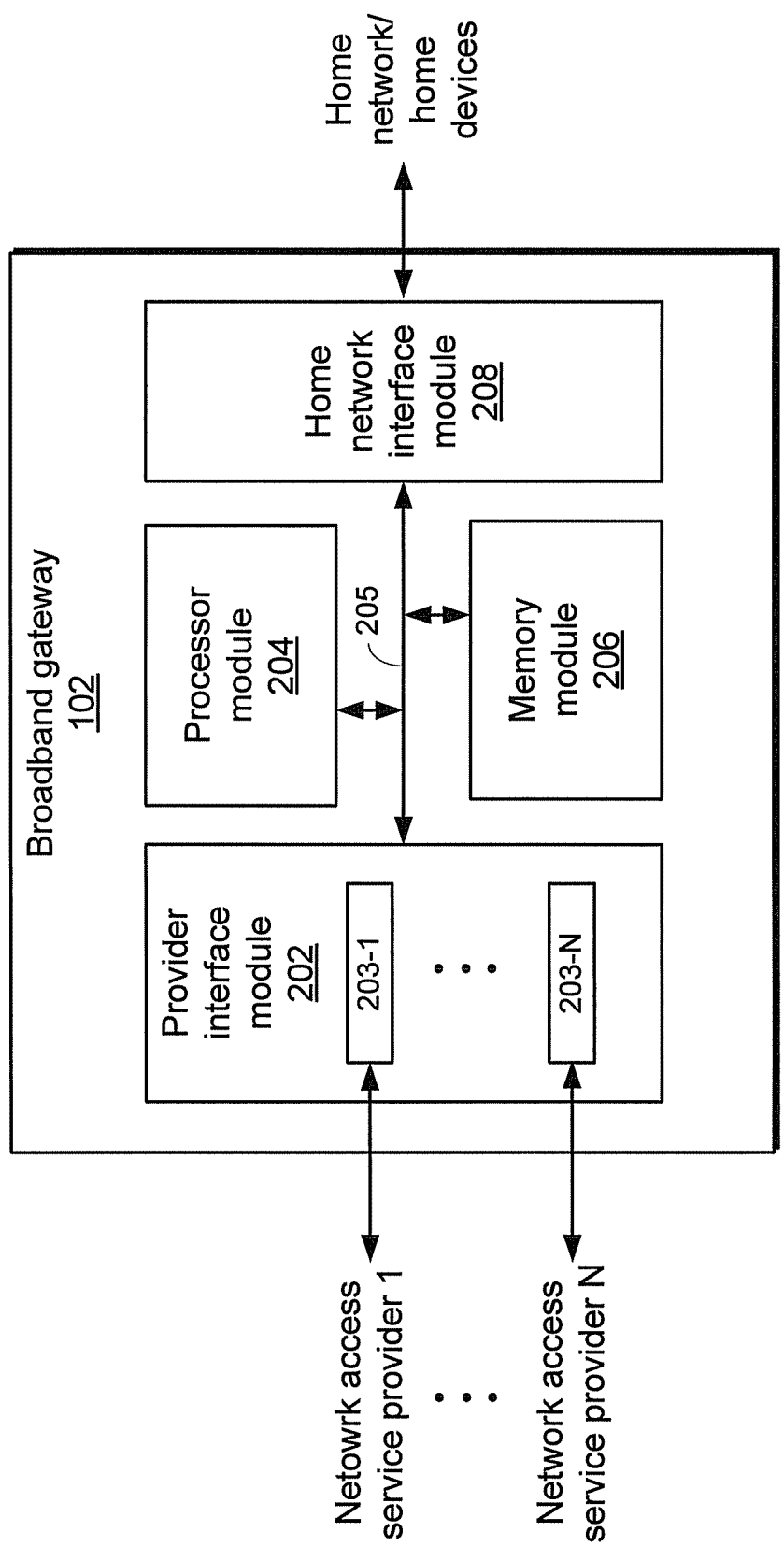

FIG. 2B is a block diagram illustrating an exemplary broadband gateway, in accordance with another embodiment of the invention. Referring to FIG. 2B, there is shown the broadband gateway 102 with the provider interface module 202 comprising N separate network interfaces 301-1, ..., 300-N, each of which is associated with one of the N network access service providers 120. In this manner, the broadband gateway 102 may separately interface with the network access service providers 120. The network interfaces 301-1, ..., 300-N may enable the broadband gateway 102 to handle separate physical layer access for each of the N network access service providers 120. For example, the broadband gateway 102 may interface with each of a cellular service provider, a CATV provider, a satellite television provider, an ISP, and/or POTS provider through a separate network interface, each of which comprises suitable logic, circuitry, code, and/or interfaces to enable physical layer access.

Figure 3A:
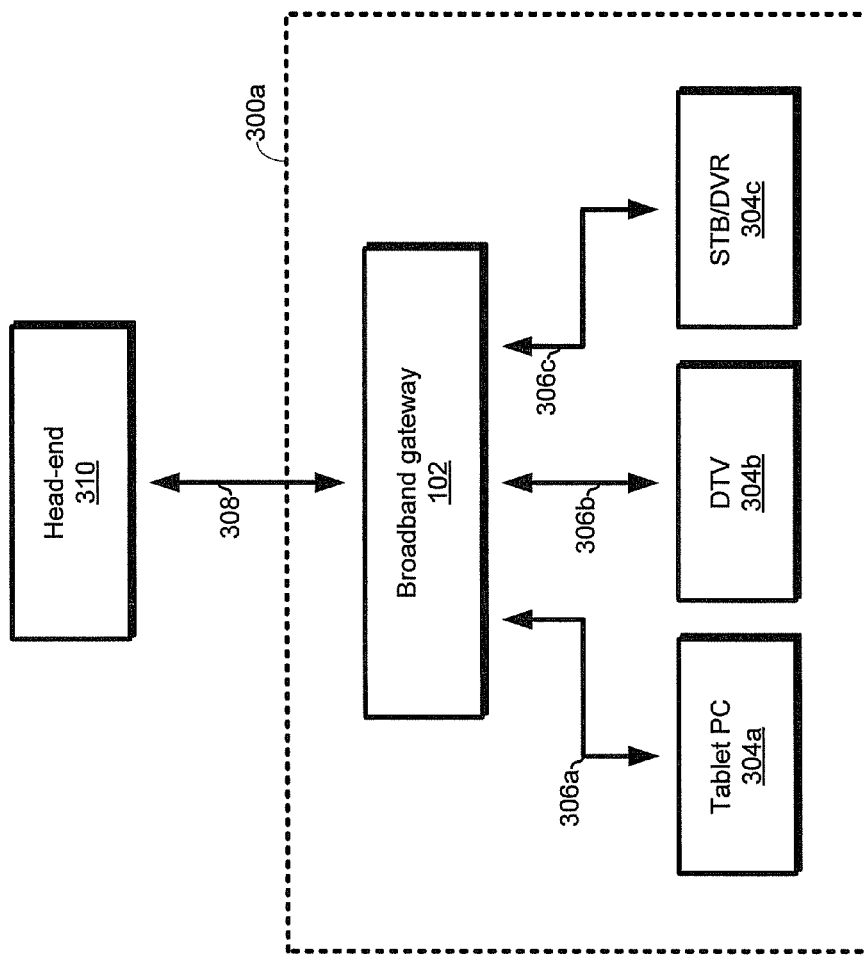
FIGS. 3A and 3B are block diagrams that illustrate exemplary connections to a broadband gateway, in accordance with embodiments of the invention.

FIG. 3A is a block diagram that illustrates exemplary connections to a broadband gateway, in accordance with an embodiment of the invention. Referring to FIG. 3A, there is shown the broadband gateway 102 described above with a tablet PC 304a, a digital television (DTV) 304b, and a set-top-box (STB)/DVR 304c connected to the broadband gateway 102 through links 306a, 306b, and 306c, respectively. The broadband gateway 102 is shown in a home network 300a that also comprises the tablet PC 304a, the DTV 304b, and the STB/DVR 304c. The broadband gateway 102 may also be connected to a head-end 310, which resides outside of the home network 300, through a broadband connection 308. The links 306a-306c, the home network 300a, and the broadband connection 308 may be the same or substantially similar to the links 106a-106j, the home network 100a, and the broadband connections 108 described above with respect to FIG. 1, respectively. Moreover, the tablet PC 304a, the DTV 304b, and the STB/DVR 304c may correspond to home devices in a home network such as the home devices 104a-104j in the home network 100a described above.

The broadband gateway 102 may receive and store information related to the capabilities of each of the tablet PC 304a, the DTV 304b, and the STB/DVR 304c. Each of the tablet PC 304a, the DTV 304b, and the STB/DVR 304c may request content from the broadband gateway 102. The information regarding the capabilities of any one device for handling certain types of content may have been received by the broadband gateway 102 in connection with establishing a link with the device and/or in connection with a request for content from the device. The broadband gateway 102 may process requests for content based on the capabilities of the device requesting the content, the content that may be available to the broadband gateway 102 from the head-end 310, and/or an optimization operation that is utilized to reduce bandwidth requirements and/or power consumption within the home network 300a, for example.

The head-end 310 may be a device associated with the distribution networks 110, the network access service providers 120, and/or the content providers 130 that supports centralized functions related to content distribution. For example, the head-end 310 may be operable to receive signals comprising content and may process such signals for distribution to the broadband gateway 102. In some instances, the head-end 310 may be communicatively coupled to multiple broadband gateways 102. The broadband gateway 102 and the head-end 310 may be operable to exchange information such that the appropriate content may be received by the broadband gateway 102 for use within the home network 300a. In this regard, the broadband gateway 102 may request information related to content that may be available from the head-end 310 and the head-end 310 may provide to the broadband gateway 102 information related to the content, including characteristics associated with the content. Moreover, the broadband gateway 102 may request that the head-end 310 provide a particular type of content to the broadband gateway 102 when such type of content is available.

The head-end 310 may be operable to separate the traffic associated with the distribution networks 110, the network access service providers 120, and/or the content providers 130. In this regard, the head-end 310 may provide filtering functions that enable some of the content to be filtered out such that a reduced amount of content is available to the broadband gateway 102. For example, the head-end 310 may be utilized to select a subset of channels or sources from the distribution networks 110, the network access service providers 120, and/or the content providers 130 that are available to the broadband gateway 102.

Figure 3B:
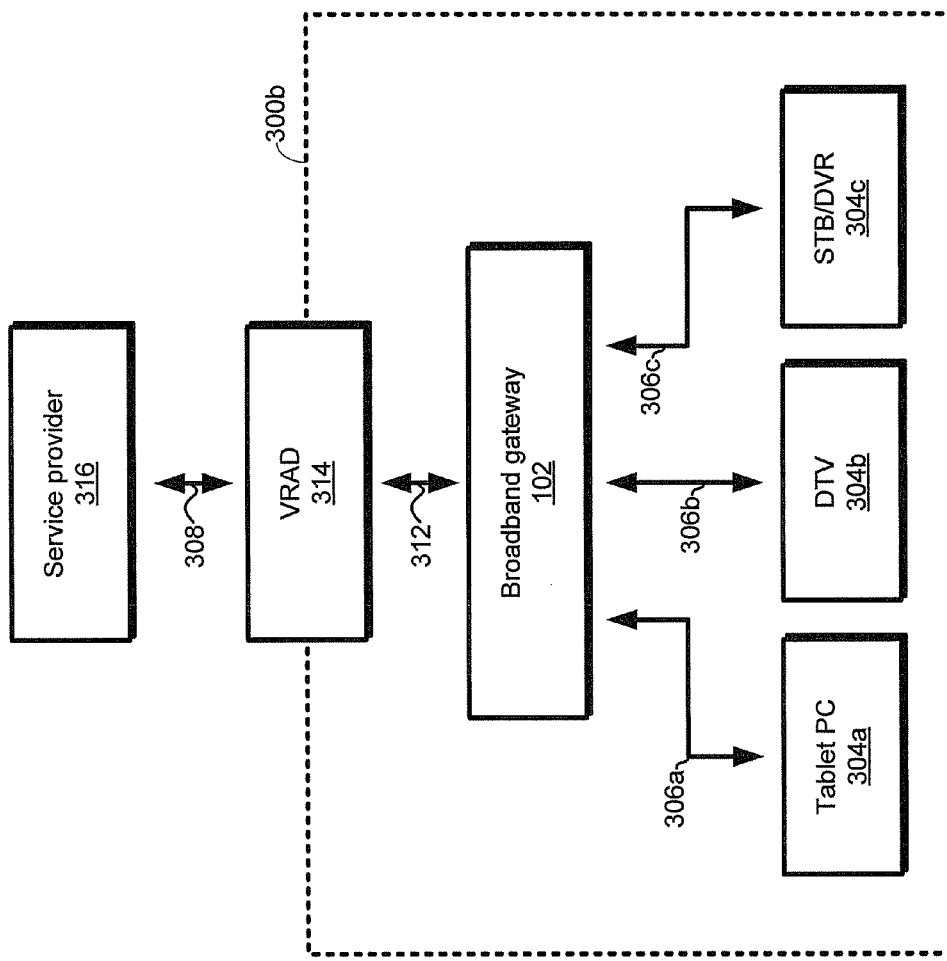

FIG. 3B is a block diagram that illustrates exemplary connections to a broadband gateway, in accordance with another embodiment of the invention. Referring to FIG. 3B, there is shown a home network 300b that comprises the broadband gateway 102, the tablet PC 304a, the DTV 304b, and the STB/DVR 304c described above with respect to FIG. 3A. Also shown is a video-ready access device (VRAD) 314 and a service provider 316. The VRAD 314 may communicate with the broadband gateway 102 through a broadband connection 312 and with the service provider 316 through the broadband connection 308. The service provider 316 may be, for example, a provider of DSL and/or high-definition (HD) television such as AT&T U-verse services, for example.

In some instances, a portion of the VRAD 314 may be part of the home network 300b, while in other instances the VRAD 314 may be outside of the home network 300b. The VRAD 314 may be operable to receive signals comprising content from the service provider 316, and may process such signals for distribution to the broadband gateway 102, for example. The broadband gateway 102 and the VRAD 314 may be operable to exchange information such that the appropriate content may be received by the broadband gateway 102. In this regard, the broadband gateway 102 may request information related to content that may be available from the VRAD 314 and the VRAD 314 may provide information related to the content to the broadband gateway 102, including characteristics associated with the content. Moreover, the broadband gateway 102 may request that the VRAD 314 provide a particular type of content to the broadband gateway 102 when such type of content is available.

Various exemplary scenarios are presented below with respect to FIGS. 4A-4E that are based on the diagram shown in FIG. 3A and that illustrate efficient ways to handle content between the broadband gateway 102, the home devices 304a, 304b, and 304c, and the head-end 310. These scenarios are provided by way of exemplary illustration and not of limitation. Other scenarios, including scenarios in which the diagram shown in FIG. 3B may be utilized, may also illustrate efficient or optimized handling of content in a home network associated with a broadband gateway.

Figure 4A:
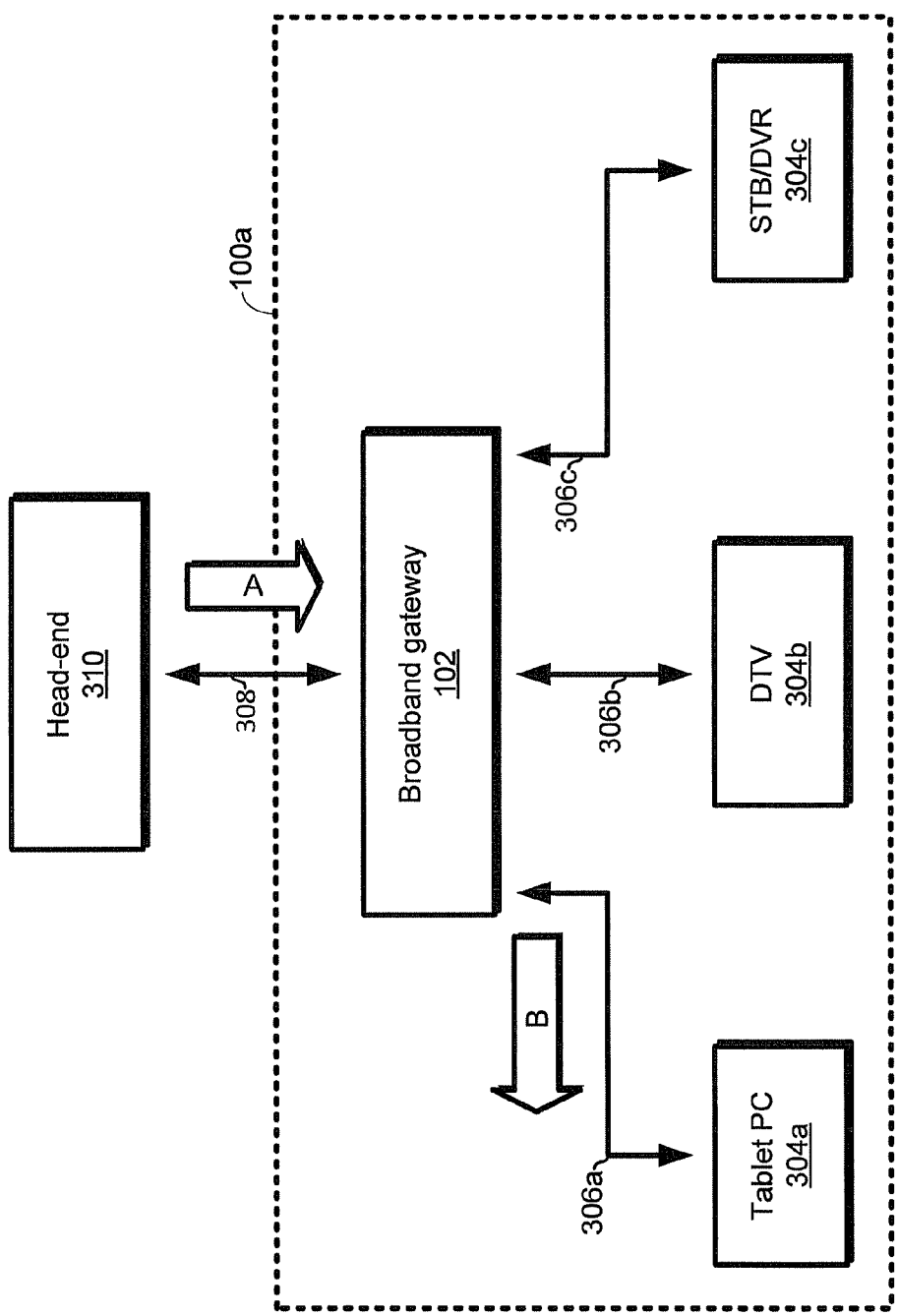
FIGS. 4A-4E are diagrams that illustrate exemplary scenarios for optimizing communication in home network utilizing a broadband gateway, in accordance with embodiments of the invention.

FIG. 4A is a diagram that illustrates an exemplary scenario for optimizing communication in home network utilizing a broadband gateway, in accordance with embodiments of the invention. Referring to FIG. 4A, there is shown the broadband gateway 102, the tablet PC 304a, the DTV 304b, the STB/DVR 304c, and the head-end 310 described above with respect to FIG. 3A. In this first exemplary scenario, the tablet PC 304a may request that specific content, such as a specific video content, for example, be provided through the broadband gateway 102. For example, a user of the tablet PC 304a may wish to have the evening news from a certain station be shown on the tablet PC 304a. The user may provide an input to the tablet PC 304a, which in response to such input from the user, may generate one or more signals that correspond to a request for the desired programming, in this case the evening news, to be sent, downloaded, and/or streamed to the tablet PC 304a.

The broadband gateway 102 may receive the signals from the tablet PC 304a and may determine, based on those signals, the content being requested by the tablet PC 304a. The broadband gateway 102 may utilize information about the capabilities of the tablet PC 304a, which may be locally stored in the broadband gateway 102, to generate one or more signals to request information from the head-end 310 as to the type of content that may be available from the head-end 310 that corresponds to the content being requested by the tablet PC 304a.

In this exemplary scenario, the tablet PC 304a may not support processing and/or display of HD-formatted video content and receiving the evening news in such a format may not be desirable. The head-end 310, however, may have the evening news in both HD format and in a lower resolution format, such as the format used for preview channels, for example, which in this instance may be supported by the tablet PC 304a. Accordingly, the head-end 310 may respond to the request for information from the broadband gateway 102 by providing information to the broadband gateway 102 regarding the two different choices in content type or format that are available from the head-end 310 for the evening news. The broadband gateway 102 may in turn select to have the lower resolution evening news be delivered from the head-end 310 and may subsequently communicate the lower resolution evening news to the tablet PC 304a for display. This process is shown in FIG. 4A by the arrow labeled A, which represents the lower resolution evening news being communicated from the head-end 310 to the broadband gateway 102, and the arrow labeled B, which represents the lower resolution evening news being communicated from the broadband gateway 102 to the tablet PC 304a.

By utilizing the lower resolution format that is available for the evening news at the head-end 310, the broadband gateway 102 need not convert the unsupported HD format, which may be a default or preferred delivery format by the service and/or content provider, to a format that is suitable for handling by the tablet PC 304a. Such an approach may not only reduce the bandwidth needed to provide the desired content to the tablet PC 304a, but may also reduce power consumption since the processing involved in performing the format conversion is not necessary.

There may be instances in which the head-end 310 may have available the evening news in both HD format and in a lower resolution format that is not supported by the tablet PC 304a. In such instances, the head-end 310 may provide information to the broadband gateway 102 regarding the two different choices in content type or format that are available from the head-end 310 for the evening news. In this exemplary scenario, the broadband gateway 102 may be operable to convert either the HD format or the lower resolution format to a format that is suitable for the tablet PC 304a to handle. The broadband gateway 102 may determine, however, that selecting the lower resolution format may result in reduced bandwidth requirements and/or reduced processing requirements than if the HD format were selected. Accordingly, the broadband gateway 102 may request that the lower resolution evening news be provided from the head-end 310 and may convert the lower resolution evening news received from the head-end 310 to a format that is supported by the tablet PC 304a. This process may also be shown in FIG. 4A where the arrow labeled A represents the lower resolution evening news from the head-end 310 to the broadband gateway 102, and the arrow labeled B represents the converted lower resolution evening news from the broadband gateway 102 to the tablet PC 304a.

When provided with the above-described choices, the broadband gateway 102 may determine the approach that may reduce or optimize one or both of the bandwidth and the processing needed to deliver the content to the tablet PC 304a. When a choice is not provided, that is, when only the HD format is available, for example, the broadband gateway 102 may request and receive the HD-formatted evening news from the head-end 310 and may convert the HD-formatted evening news to a format that is supported by the tablet PC 304a.

The conversion of content, such as the conversion of video content and/or audio content from one format to another format, for example, may sometimes involve one or more processes and/or operations. One type of content conversion operation may be referred to as transcoding, in which there may be a direct digital-to-digital conversion from one encoding format to another encoding format. Transcoding may be utilized by the broadband gateway 102 or by a device in the home network 300a, when a target device, such as the tablet PC 304a, for example, does not support a content format that is available from the head-end 310, or when the tablet PC 304a has limited storage and a reduced file size may be needed. In an exemplary embodiment of the invention, the transcoding may comprise two steps, the first step being one in which the original content, such as data, stream, or file, for example, is decoded to an uncompressed format, and the second step being one in which the content in uncompressed format is encoded to a target format.

Other types of content conversion operations, which may also be supported by the broadband gateway 102 or by a device in the home network 300a, may include transrating and transsizing operations. In transrating, the bit rate associated with the content may be changed to enable lower bandwidth channels. In such instances, the bit rate may be typically reduced by sample rate conversion or higher compression, for example. In transsizing, an image may be scaled to reduce the information being carried in the content. In some instances, transsizing may be performed with transrating, such as when an image is down-sampled to allow lower bit rates.

Figure 4B:
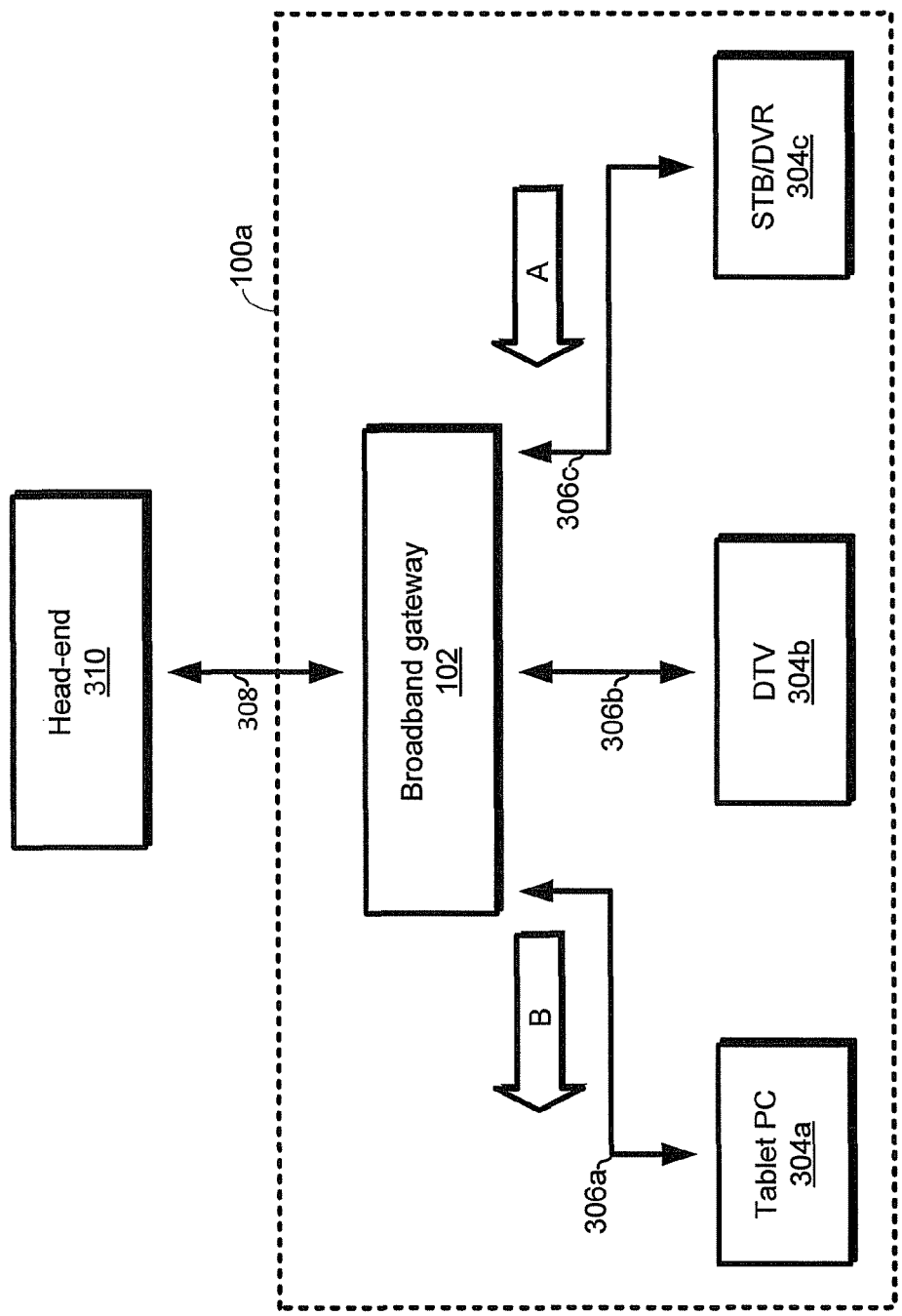

FIG. 4B is a diagram that illustrates an exemplary scenario for optimizing communication in home network utilizing a broadband gateway, in accordance with an embodiment of the invention. Referring to FIG. 4B, there is shown a second exemplary scenario in which the tablet PC 304a may request that specific content, such as a specific video content, for example, be provided through the broadband gateway 102. For example, a user of the tablet PC 304a may wish to have a certain movie shown on the tablet PC 304a. The user may provide an input to the tablet PC 304a, which in response to such input from the user, may generate one or more signals that correspond to a request for the desired movie to be sent, downloaded and/or streamed to the tablet PC 304a.

The broadband gateway 102 may receive the signals from the tablet PC 304a and may determine, based on those signals, the content being requested by the tablet PC 304a. The broadband gateway 102 may utilize information about the capabilities of the tablet PC 304a, which may be locally stored in the broadband gateway 102, to generate one or more signals to request information from the head-end 310 and from the STB/DVR 304c as to the type of content that may be available that corresponds to the content being requested by the tablet PC 304a.

The head-end 310 may have the desired movie in HD format, which is not supported by the tablet PC 304a, while the STB/DVR 304c may have the same movie stored in a lower resolution format, which is supported by the tablet PC 304a. The copy of the movie stored in the STB/DVR 304c may have resulted from a previous but unsuccessful attempt to watch the desired movie by the user of the tablet PC 304c.

At the time the movie was stored in the STB/DVR 304c, the user may have wanted to watch it on the DTV 304b. Now, some time later, the user is again trying to watch the same movie but utilizing the tablet PC 304c.

In this instance, the head-end 310 and the STB/DVR 304c may respond to the request for information from the broadband gateway 102 by providing information to the broadband gateway 102 regarding the choices in content type or format that are available. The broadband gateway 102 may in turn select to have the lower resolution movie be delivered from the STB/DVR 304c and subsequently communicated to the tablet PC 304a. This process is shown in FIG. 4B by the arrow labeled A, which represents the low resolution movie being communicated from the STB/DVR 304c to the broadband gateway 102, and the arrow labeled B, which represents the low resolution movie being communicated from the broadband gateway 102 to the tablet PC 304a.

By utilizing the lower resolution format that is available for the movie from the STB/DVR 304c, the broadband gateway 102 need not convert the unsupported HD format to a format that is suitable to the tablet PC 304a. Such an approach may not only reduce the bandwidth needed to provide the desired content to the tablet PC 304a, but may also reduce power consumption since the processing involved in performing the format conversion is not necessary.

There may be instances in which the head-end 310 may have available the movie in HD format and the STB/DVR 304c may have the same movie available in a lower resolution format that is not supported by the tablet PC 304a. In such instances, the head-end 310 and the STB/DVR 304c may provide information to the broadband gateway 102 regarding the choices in content type or format that are available for the movie. In this exemplary scenario, the broadband gateway 102 may be operable to convert either the HD format or the lower resolution format to a format that is suitable for the tablet PC 304a to handle. The broadband gateway 102 may determine, however, that selecting the lower resolution format from the STB/DVR 304c may result in reduced bandwidth requirements and/or reduced processing requirements than if the HD format from the head-end 310 were selected. Accordingly, the broadband gateway 102 may request that the lower resolution movie be provided from the STB/DVR 304c and may convert the lower resolution movie received from the STB/DVR 304c to a format that is supported by the tablet PC 304a. This process may also be shown in FIG. 4B where the arrow labeled A represents the lower resolution movie from the STB/DVR 304c to the broadband gateway 102, and the arrow labeled B represents the converted lower resolution movie from the broadband gateway 102 to the tablet PC 304a.

Figure 4C:
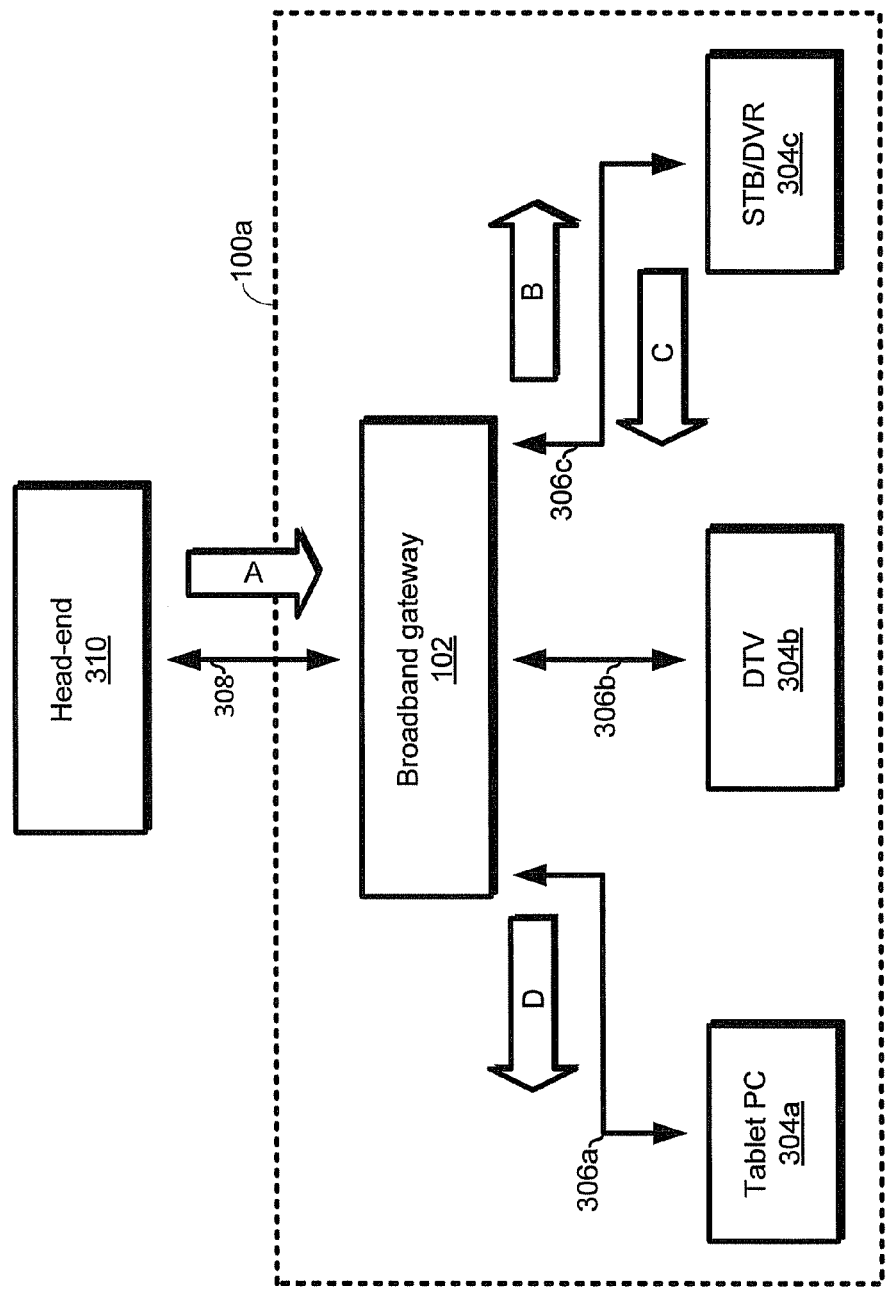

FIG. 4C is a diagram that illustrates an exemplary scenario for optimizing communication in home network utilizing a broadband gateway, in accordance with embodiments of the invention. Referring to FIG. 4C, there is shown a third exemplary scenario in which the tablet PC 304a may request that specific content, such as specific video content, for example, be provided through the broadband gateway 102. For example, a user of the tablet PC 304a may wish to have a certain movie shown on the tablet PC 304a and may generate one or more signals that correspond to a request for the desired movie to be sent, downloaded and/or streamed to the tablet PC 304a.

The broadband gateway 102 may receive the signals from the tablet PC 304a and may determine, based on those signals, the content being requested by the tablet PC 304a. The broadband gateway 102 may utilize information about the capabilities of the tablet PC 304a, which may be locally stored in the broadband gateway 102, to generate one or more signals to request information from the head-end 310 and from the STB/DVR 304c as to the type of content that may be available that corresponds to the content being requested by the tablet PC 304a.

The head-end 310 may have the desired movie in multiple formats, none of which is supported by the tablet PC 304a, while the STB/DVR 304c may have the same movie stored in another format, which is also not supported by the tablet PC 304a. The head-end 310 and the STB/DVR 304c may provide information to the broadband gateway 102 regarding the choices in content type or format that are available for the movie. In this exemplary scenario, the broadband gateway 102 may be operable to convert any of the available formats to a format that is suitable for the tablet PC 304a to handle. However, the STB/DVR 304c may be operable to convert one of the formats available from the head-end 310 into a suitable format for the tablet PC 304a in a manner that is far more efficient than any conversion supported by the broadband gateway 102. Moreover, such conversion by the STB/DVR 304c produces a converted movie that requires much less bandwidth than that needed to transfer the copy of the movie stored in the STB/DVR 304c. In this instance, and having such capability information about the STB/DVR 304c available, the broadband gateway 102 may determine that the most efficient approach is to have the movie be provided by the head-end 310 in one format, have the movie converted to another format by the STB/DVR 304c, and communicate the converted movie to the tablet PC 304a. This process is shown in FIG. 4C by the arrow labeled A, which represents the movie in a first format being communicated from the head-end 310 to the broadband gateway 102, the arrow labeled B, which represents the movie in the first format being communicated from the broadband gateway 102 to the STB/DVR 304c for processing, the arrow labeled C, which represents the movie converted to a second format being communicated back to the broadband gateway 102, and the arrow labeled D, which represented the movie in the second format being communicated to the tablet PC 304a.

Figure 4D:
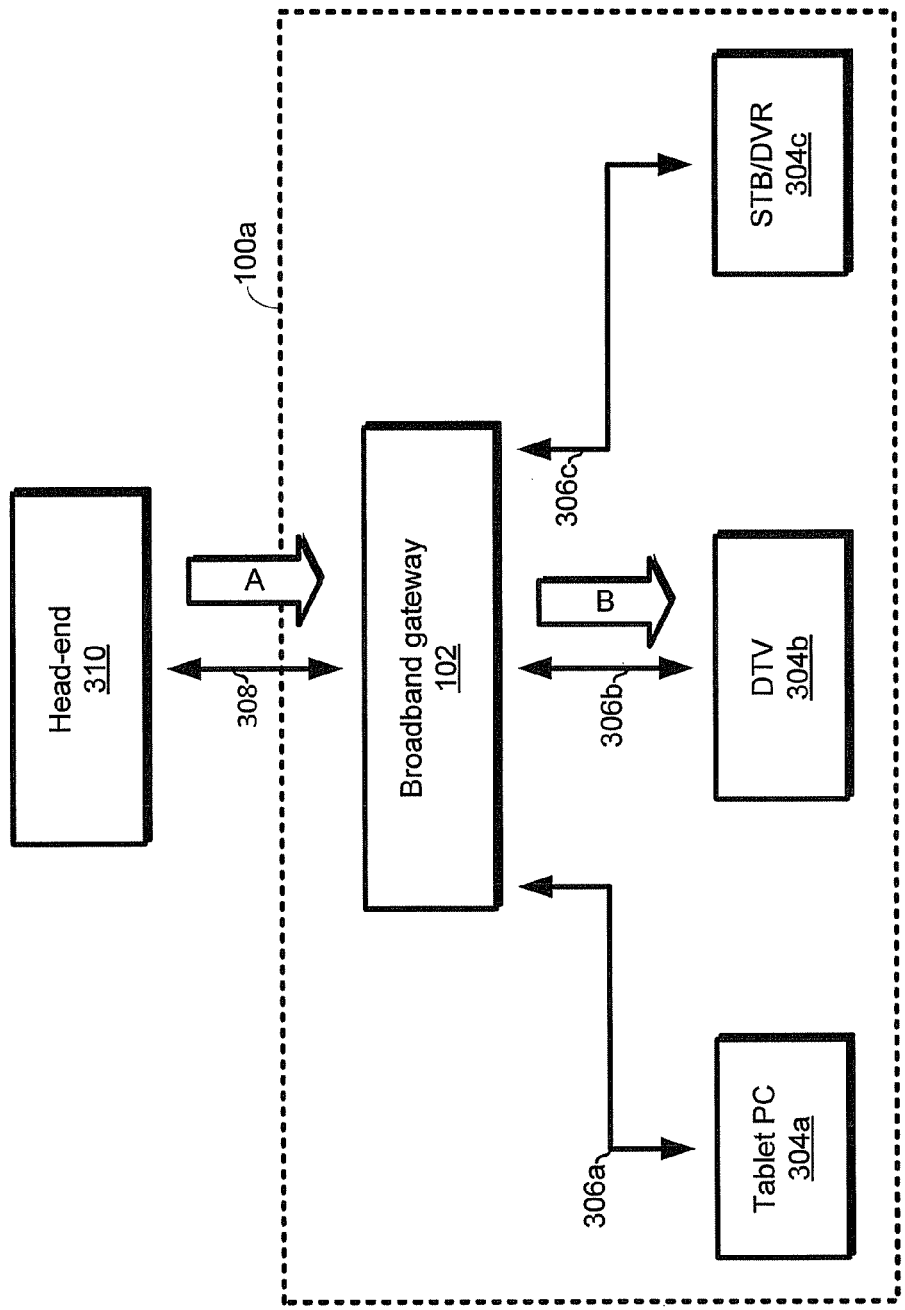

FIG. 4D is a diagram that illustrates an exemplary scenario for optimizing communication in a home network utilizing a broadband gateway, in accordance with embodiments of the invention. Referring to FIG. 4D, there is shown a fourth exemplary scenario in which the DTV 304b may generate one or more signals to request that specific content, such as specific video content, be provided through the broadband gateway 102. For example, a user of the DTV 304b may wish to have a particular football game shown on the DTV 304b.

The broadband gateway 102 may receive the signals from the DTV 304b and may determine, based on those signals, the content being requested by the DTV 304b. The broadband gateway 102 may utilize information 102 about the capabilities of the DTV 304b, which may be locally stored in the broadband gateway 102, to generate one or more signals to request information from the head-end 310 as to the type of content that may be available from the head-end 310 that corresponds to the content being requested by the DTV 304b.

In this exemplary scenario, the DTV 304b may not support surround sound, three-dimensional (3D) video, and/or high frame rate video. The head-end 310 may have the desired football game available in various formats, including formats that are supported by the various capabilities of the DTV 304b. In such an instance, the head-end 310 may respond to the request for information from the broadband gateway 102 by providing information to the broadband gateway 102 as to the choices in content type or format that are available from the head-end 310 for the specific video content. The broadband gateway 102 may in turn select to have a broadcast of the football game in stereo sound, with a low frame rate, and not in 3D. This process is shown in FIG. 4D by the arrow labeled A, which represents the selected football game broadcast being communicated from the head-end 310 to the broadband gateway 102, and the arrow labeled B, which represents the selected football game broadcast being communicated from the broadband gateway 102 to the DTV 304b.

By selecting an appropriate format for the desired video content for the DTV 304b, bandwidth resources may be conserved by removing the need to provide additional information, such as additional audio channels and/or additional 3D video information, which is not be supported by the DTV 304b.

Figure 4E:
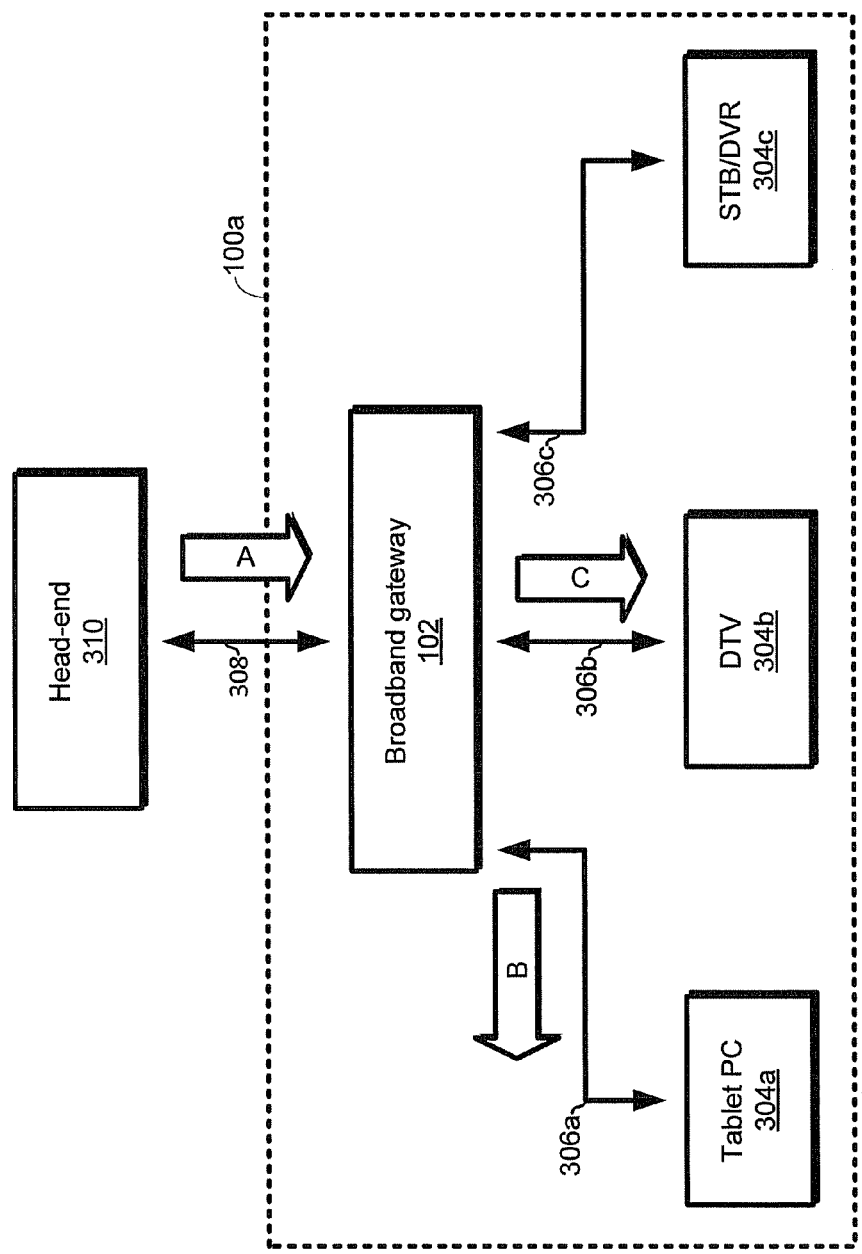

FIG. 4E is a diagram that illustrates an exemplary scenario for optimizing communication in a home network utilizing a broadband gateway, in accordance with embodiments of the invention. Referring to FIG. 4E, there is shown a fifth exemplary scenario in which the tablet PC 304a and the DTV 304b may generate one or more signals to request that specific content, such as specific video content, be provided through the broadband gateway 102. For example, a user of the tablet PC 304a and a user of the DTV 304b may both wish to have the same football game be shown in the tablet PC 304a and in the DTV 304b.

The broadband gateway 102 may receive signals from the tablet PC 304a and from the DTV 304b, and may determine, based on those signals, the content that is being requested by both devices. The broadband gateway 102 may utilize information about the capabilities of the tablet PC 304a and of the DTV 304b, which may be locally stored in the broadband gateway 102, to generate one or more signals to request information from the head-end 310 as to the type of content that may be available that corresponds to the content being requested by the tablet PC 304a and the DTV 304b.

In this instance, the head-end 310 may have the desired football game in HD format, which is supported by the DTV 304b but not by the tablet PC 304a. The head-end 310 may respond to the request for information from the broadband gateway 102 by providing information to the broadband gateway 102 regarding the available content type or format. The broadband gateway 102 may obtain the football game in HD format and may provide that format to the DTV 304b. Moreover, the broadband gateway 102 may transcode, transrate, and/or transize the football game received in HD format from the head-end 310 to a format that is suitable for the tablet PC 304a. This process is shown in FIG. 4E by the arrow labeled A, which represents the HD-formatted football game being communicated from the head-end 310 to the broadband gateway 102, the arrow labeled B, which represents the reformatted football game being communicated from the broadband gateway 102 to the tablet PC 304a, and by the arrow labeled C, which represents the HD-formatted football game being communicated from the broadband gateway 102 to the DTV 304b.

By receiving the football game in a single format, the broadband gateway 102 may reduce the bandwidth needed to provide the desired content to both the tablet PC 304a and the DTV 304b.

There may be instances in which the head-end 310 may have the football game available in multiple formats. In such instances, the head-end 310 may provide information to the broadband gateway 102 regarding the choices in content type or format that are available. In this exemplary scenario, the broadband gateway 102 may be operable to select one of the formats available at the head-end 310. The format selected may be suitable for one of the tablet PC 304a and the DTV 304b, with the other device requiring that the broadband gateway 102 reformat the content. When the format selected is not directly suitable to either device, the broadband gateway 102 may need to reformat the content before communicating the content to both devices. The broadband gateway 102 may determine that selecting a particular format to provide content to both the tablet PC 304a and the DTV 304b may result in reduced bandwidth requirements and/or reduced processing requirements than if any other format available at the head-end 310 were selected. This process may also be shown in FIG. 4E where the arrow labeled A now represents the football game in the format selected by the broadband gateway 102, and the arrows labeled B and C represents the football game being communicated from the broadband gateway 102 to the tablet PC 304a and the DTV 304b, respectively, in the appropriate format.

Figure 5:
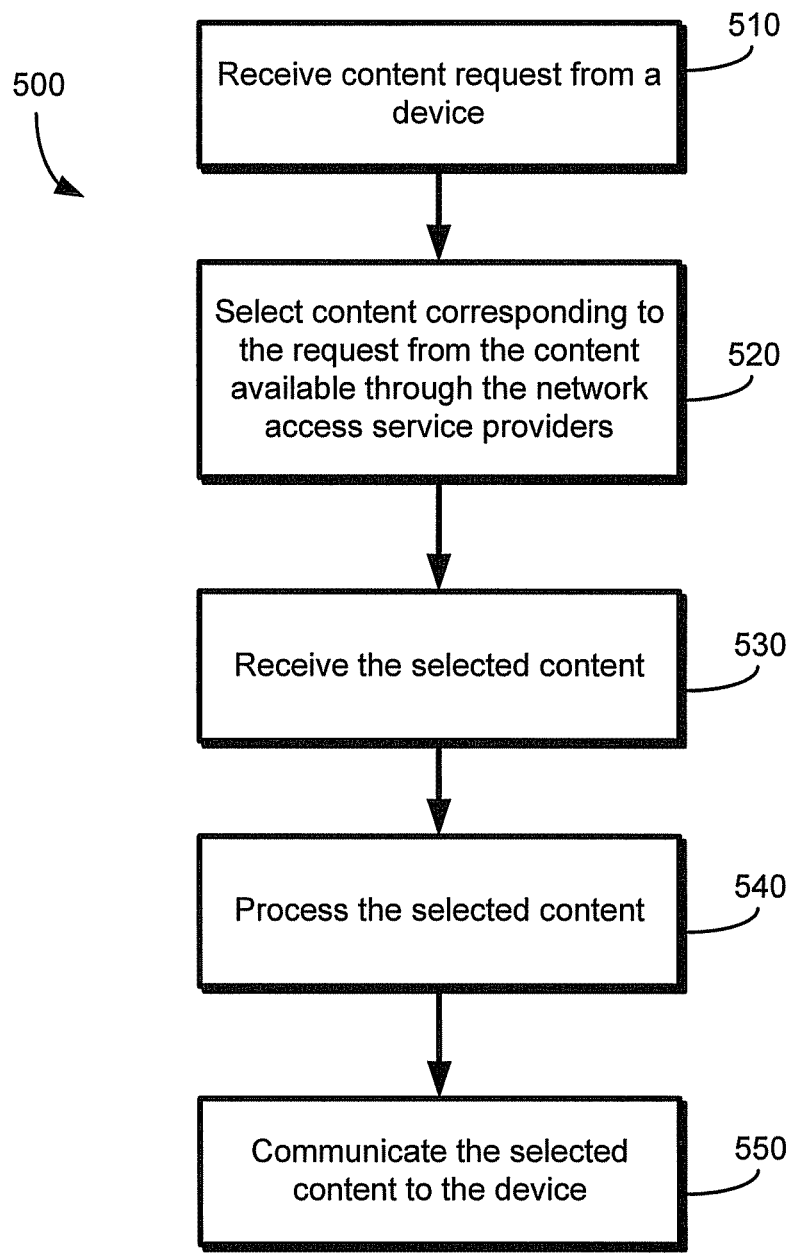
FIG. 5 is a flow chart that illustrates exemplary steps for selecting content for consumption in a home network utilizing a broadband gateway, in accordance with an embodiment of the invention.

FIG. 5 is a flow chart that illustrates exemplary steps for selecting content for consumption in a home network utilizing a broadband gateway, in accordance with an embodiment of the invention. Referring to FIG. 5, there is shown a flow chart 500 in which, at step 510, the broadband gateway 102 may receive a content request, or other like indication for a particular content, from a device such as one of the home devices 104a-104j described above with respect to FIG. 1. The content being requested may be video content, audio content, data, files, and/or a combination thereof.

At step 520, the broadband gateway 102 may select content that corresponds to the content being requested from content that may be available through at least one of the network access service providers 120 described above. For example, when the network access service providers 120 comprise the head-end 310 and/or the VRAD 314 as illustrated in FIGS. 3A and 3B, respectively, the broadband gateway 102 may make the content selection from content that may be available through those devices. The content selection may be based, at least in part, on an optimization operation. An example of an optimization operation is presented below with respect to FIG. 6. At step 530, the broadband gateway 102 may receive the selected content through one or more of the network access service providers 120 and/or from one of the home devices 104a-104j.

At step 540, the content received may be processed by the broadband gateway 102, or may be communicated for processing to one of the home devices 104a-104j other than the device making the request. The processing may comprise a conversion of the selected content from one format to another format that may be supported by the device making the request. In this regard, the format conversion may involve having one or more characteristics of the content modified. The processing described above with respect to step 540 may be optional and may not be utilized when the content selected by the broadband gateway 102 is in a format that is supported by the target device. At step 550, the selected content, once appropriately formatted, may be communicated to the device for consumption by the user of the device. In some instances, the target device, that is, the device making the request, may further process the content received. Such processing may comprise an additional format conversion, for example.

Figure 6:
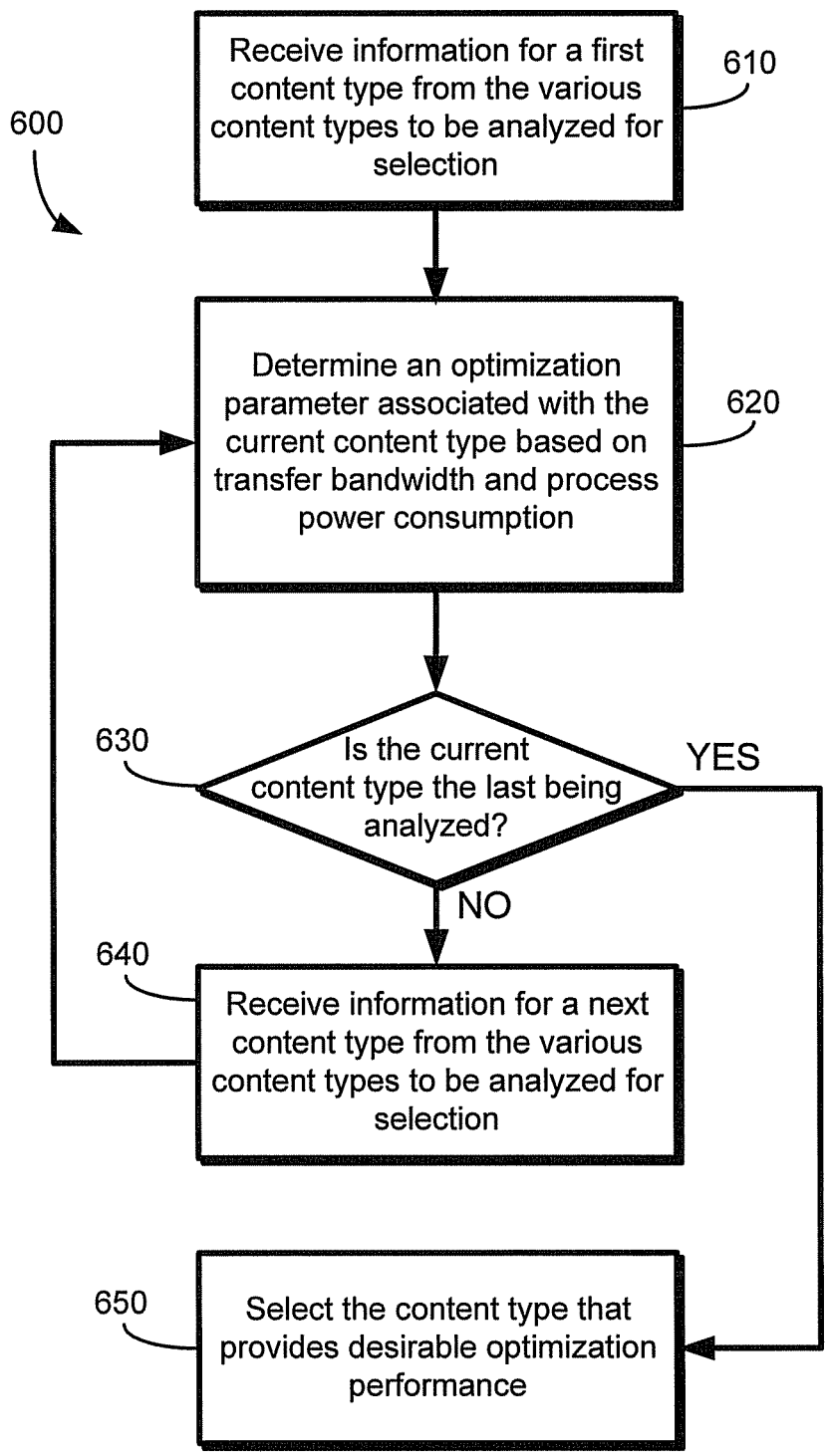
FIG. 6 is a flow chart that illustrates exemplary steps for selecting content based on an optimization parameter, in accordance with an embodiment of the invention.

FIG. 6 is a flow chart that illustrates exemplary steps for selecting content based on an optimization parameter, in accordance with an embodiment of the invention. Referring to FIG. 6, there is shown a flow chart 600 in which, at step 610, the broadband gateway 102 may receive information related to a first of multiple content types associated with a content request that are to be analyzed by the broadband gateway 102 to select one of the content types. For example, the broadband gateway 102 may have received a request for a particular content from a home device in the home network 100a shown in FIG. 1. In this regard, a content type may refer to a certain format of content that is associated with the request made by the home device in the home network 100a. The broadband gateway 102 may obtain information through one or more network access service providers 120 and/or from one or more home devices in the home network 100a about different types of content that may be available to be provided to the broadband gateway 102 and that correspond to the particular content that is being requested by the home device. The broadband gateway 102 may then proceed to analyze each of the available content types to determine which one to select.

At step 620, the analysis by the broadband gateway 102 of the current content type under consideration may comprise determining an optimization parameter associated with the current content type. The optimization parameter may be based on a bandwidth necessary to transfer the current content type being considered within the home network 100a and/or on a power that may be consumed when processing the current content type by the broadband gateway 102 and/or by a device in the home network 100a.

At step 630, the broadband gateway 102 may determine whether the current content type being considered is the last content type that is available to the broadband gateway 102. When the current content type is the last content type, the process may proceed to step 650 in which the broadband gateway 102 may select the content type with the optimization parameter that results in a desirable bandwidth and/or power consumption performance. When the current content type is not the last content type being considered, the process may proceed to step 640 in which the broadband gateway 102 may receive or retrieve information related to a next content type for analysis. Once such information is obtained, the process may proceed to step 620 described above.

In accordance with an embodiment of the invention, aspects of a method and a system may comprise a broadband gateway, such as the broadband gateway 102, which is operable to handle at least one physical layer connection to at least one corresponding network access service provider. The at least one corresponding network access service provider may refer to one or more of the network access service providers 120, for example. The broadband gateway 102 may enable communication with o one or more devices, such as the home devices 104a-104j connected to the broadband gateway 102 through the home network 100a, for example. In some instances, the broadband gateway 102 may have stored in the memory module 206 capability information for a particular device of the one or more devices. The capability information may comprise display capabilities, audio reproduction capabilities, encoding capabilities, decoding capabilities, and/or storage capabilities, for example. The broadband gateway 102 may be operable to receive a request for content from the particular device such that the content may be presented to a user of the device.

Once the content request is received, the broadband gateway 102 may select, from content that is available through at least one of the network access service providers 120, a content that corresponds to the request. In some instances, the selection of the content that corresponds to the request may also be made from content stored in one or more of the devices connected to the broadband gateway 102. The content selection may be performed by the processor module 204 in the broadband gateway 102, for example. After the selection is made, the broadband gateway 102 may receive the selected content for communication to the particular device through the home network interface module 208. The selection of the content that corresponds to the request may be based on the capabilities of the particular device and on an optimization associated with one or both of a bandwidth to transfer the content within the home network 100a and a power consumed to process the content. Moreover, the broadband gateway 102 may receive information associated with the content that is available through the network access service providers 120 and may perform the selection of the content that corresponds to the request may be based on the received information. The received information associated with the content may be stored in the memory module 206 and may be processed by the processor module 204, for example.

The process of the content that is associated with the optimization described above may comprise operations to decode and re-encode the content, for example. Such operations may be supported, at least in part, by the processor module 204, for example. The optimization may comprise a minimization of the bandwidth that may be needed to transfer the content within the home network 100a. The optimization may comprise a minimization of the power consumed to process the content, whether the content is processed by the broadband gateway 102 and/or by other device in the home network 100a.

In some instances, the broadband gateway 102 may communicate the selected content to a device of the one or more devices connected to the broadband gateway 102 other than the particular device described above. The device to which the selected content is to be communicated may be operable to decode and re-encode the selected content to produce a re-encoded selected content. The broadband gateway 102 may then receive the re-encoded selected content for communication to the particular device.

In some instances, the content that corresponds to the request received by the broadband gateway 102 may comprise video content. In such instances, the selection of the video content that corresponds to the request may be based on display capabilities information comprised within the capability information of the particular device and on an optimization associated with one or both of a bandwidth to transfer the video content within the home network 100a and a power consumed to process the video content. In this regard, the process of the video content associated with the optimization may comprise operations to transcode, transrate, and/or transsize the video content. Such operations may be performed, at least in part, by the processor module 204 in the broadband gateway 102.

Another embodiment of the invention may provide a non-transitory machine and/or computer readable storage and/or medium, having stored thereon, a machine code and/or a computer program having at least one code section executable by a machine and/or a computer, thereby causing the machine and/or computer to perform the steps as described herein for optimizing communication in a home network via a gateway.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
    receiving, in a broadband gateway, capability information corresponding to a particular device of a plurality of devices, the broadband gateway being operable to enable communication with the plurality of devices, the broadband gateway being operable to handle at least one physical layer connection to at least one corresponding network access service provider, wherein the broadband gateway is configured to handle physical layer connections to the devices;
    receiving, by the broadband gateway, a request for content from the particular device;
    selecting, by the broadband gateway and based at least in part on the received capability information and version characteristics, a version of the content from a plurality of content versions that correspond to the received request and are available from the at least one corresponding network access service provider and at least one of the devices, wherein the version is one of the plurality of versions of the content, wherein the version characteristics are respectively associated with versions;
    receiving, by the broadband gateway, the selected version of the content from the access server provider or the at least one of the devices, wherein the at least one of the plurality of devices and the particular device are each connected by a direct link without an intervening gateway to the broadband gateway; and
    forwarding, by the broadband gateway, the selected version to the particular device, wherein selecting the version of the video content is further based at least in part on an amount of power that is expected to be consumed by the particular device to process at least one of the plurality of content versions.

2. The method of claim 1, wherein capability information for the particular device indicates a decoding capability for the particular device.

3. The method of claim 1, wherein the selected version of the content comprises a video format for a preview channel.

4. The method of claim 1, wherein selecting the version of the content is further based at least in part on a bandwidth being consumed by at least one of the plurality of devices.

5. The method of claim 1, wherein the capability information corresponding to the particular device indicates a storage capability for the particular device.

6. A method, comprising:
    receiving, in a broadband gateway, capability information corresponding to a particular device of a plurality of devices, the broadband gateway being operable to enable communication with the plurality of devices, the broadband gateway being operable to handle at least one physical layer connection to at least one corresponding network access service provider;
    receiving, by the broadband gateway, a request for video content from the particular device;
    selecting, by the broadband gateway and based at least in part on the received capability information and a version characteristic, a version of the video content from a plurality of content versions that correspond to the received request and are available through the at least one corresponding network access service provider or at least one of the devices, wherein the at least one of the devices and the particular device are each connected by a direct link without an intervening gateway to the broadband gateway, wherein the version is one of the plurality of versions of the content, wherein the version characteristics are respectively associated with versions;
    receiving, by the broadband gateway, the selected version of the video content; and
    forwarding, by the broadband gateway, the selected version to the particular device, wherein selecting the version of the video content is further based at least in part on an amount of power that is expected to be consumed by the particular device to process at least one of the plurality of content versions.

7. The method of claim 6, wherein the selected version is provided from the at least one of the devices to the broadband gateway and forwarded from the broadband gateway to the particular device via a home network without an intervening network when the selected version is selected from the at least one of the devices.

8. A system, comprising:
    a broadband gateway that enables communication with a plurality of devices, the broadband gateway being operable to handle at least one physical layer connection to at least one corresponding network access service provider and physical layer connections to the devices, the broadband gateway comprising at least one processor, at least one circuit, or any combination thereof that is operable to:
        receive capability information corresponding to a particular device of the plurality of devices;
        receive a request for video content from the particular device;
        select, based at least in part on the received capability information, a version of the video content from a plurality of content versions that correspond to the request and are available through the at least one corresponding network access service provider and at least one of the devices; and
        receive the selected version of the content from the at least one corresponding network access service provider or the at least one of the devices, wherein the at least one of the devices is part of a home network comprising the broadband gateway and the particular device, and the selected version is provided from the at least one of the devices to the broadband gateway via the home network, wherein the at least one processor, the at least one circuit, or any combination thereof is operable to forward the selected version of the video content to the particular device and wherein the selected version is selected based at least in part on an optimization and a version characteristic, the optimization being based at least in part upon a bandwidth to transfer the video content in the home network associated with the devices, wherein the selected version is provided from the at least one of the devices to the broadband gateway and forwarded from the broadband gateway to the particular device via the home network without an intervening network when the selected version is selected from the at least one of the devices, wherein the version is one of plurality of versions of the content, wherein the version characteristics are respectively associated with versions, wherein selecting the version of the video content is further based at least in part on an amount of power that is expected to be consumed by the particular device to process at least one of the plurality of content versions.

9. The system of claim 8, wherein the at least one processor, the at least one circuit, or any combination thereof is operable to:
provide the selected version of the content to another device of the plurality of devices for processing via the home network;
receive a processed version of the selected version of the content from the other device via the home network; and
forward the processed version of the selected version of the content to the particular device via the home network.

10. The system of claim 9, wherein the processing comprises at least one of transcoding, a rate conversion, or a size conversion from the selected version to the processed version.

11. The system of claim 8, wherein the capability information for the particular device indicates a display capability for the particular device.

12. The system of claim 8, wherein the capability information for the particular device indicates an audio capability for the particular device.

13. A method, comprising:
receiving, by a broadband gateway, capability information corresponding to a particular device of a plurality of devices;
receiving, by the broadband gateway, a request for content from the particular device;
selecting, based at least in part on the received capability information, a version of the content from a plurality of content versions available from a content provider or from at least one of the devices;
receiving, by the broadband gateway, the selected version of the content; and
forwarding the selected version of the content to the device, wherein the broadband gateway is directly connected to the devices via a home network connection interface, and the selected version is provided from the at least one of the devices to the broadband gateway via the home network interface and the selected version is forwarded from the broadband gateway to the particular device via the home network interface when the selected version is selected from the at least one of the devices, wherein selecting the version of the video content is further based at least in part on an amount of power that is expected to be consumed by the particular device to process at least one of the plurality of content versions.

14. The method of claim 13, wherein the selected version of the content comprises a video format of a plurality of video formats for same video content, the same video content being a movie, the video formats comprising high definition and standard definition.

15. The method of claim 13, wherein selecting the version of the content is further based at least in part on at least one of a bandwidth consumption or a power consumption in the home network associated with the devices.

16. The method of claim 13, wherein the capability information for the device indicates at least one of an audio capability, a display capability, a decoding capability, or a storage capability for the device.

17. A broadband gateway, comprising:
at least one processor, at least one circuit, or any combination thereof that is configured to:
provide at least one physical layer connection to at least one corresponding network access service provider and physical layer connections to a plurality of devices, wherein the broadband gateway and the devices are part of a home network, wherein the devices are each connected without an intervening gateway to the broadband gateway;
receive capability information corresponding to a particular device of the devices;
receive a request for content from the particular device;
select a version of the content from a plurality of content versions available from a content provider or from a source device of the devices based at least in part on the received capability information, wherein the version is one of the plurality of content versions of the content, wherein the version characteristics are respectively associated with the content versions;
receive the selected version of the content via the home network when the selected version is selected from the source device, wherein the version of the video content is selected based at least in part on an amount of power that is expected to be consumed by the particular device to process at least one of the plurality of content versions; and
forward, by the broadband gateway, the selected version to the particular device.

18. The broadband gateway of claim 17, wherein the at least one processor, the at least one circuit, or any combination thereof is configured to forward the selected version of the content to the particular device via the home network.

19. The broadband gateway of claim 17, wherein the at least one processor, the at least one circuit, or any combination thereof is configured to:
provide the selected version of the content to another device of the devices via the home network for processing;
receive a processed version of the selected version of the content from the another device; and
forward the processed version of the selected version of the content to a further device.

20. The broadband gateway of claim 19, wherein the processing comprises at least one of a transcoding, a rate conversion, or a size conversion from the selected version to the processed version.

* * * * *